United States Patent
Inoue

(10) Patent No.: US 8,126,941 B2
(45) Date of Patent: Feb. 28, 2012

(54) MEMORY MANAGEMENT METHOD AND SYSTEM

(75) Inventor: Hiroshi Inoue, Yamato (JP)

(73) Assignee: International Business Machines Corporation, Armonk, NY (US)

(*) Notice: Subject to any disclaimer, the term of this patent is extended or adjusted under 35 U.S.C. 154(b) by 309 days.

(21) Appl. No.: 12/430,473

(22) Filed: Apr. 27, 2009

(65) Prior Publication Data

US 2009/0271460 A1    Oct. 29, 2009

(30) Foreign Application Priority Data

Apr. 28, 2008   (JP) .................... 2008-117590

(51) Int. Cl.
*G06F 12/00* (2006.01)
(52) U.S. Cl. .................... 707/818; 707/819
(58) Field of Classification Search .......... 707/813, 707/814, 816, 819, 820, 818
See application file for complete search history.

(56) References Cited

U.S. PATENT DOCUMENTS

| 6,081,665 A * | 6/2000 | Nilsen et al. ............. 717/116 |
| 6,480,862 B1 * | 11/2002 | Gall .......................... 1/1 |
| 7,069,279 B1 * | 6/2006 | Rau et al. .................... 1/1 |

OTHER PUBLICATIONS

C. J. Cheney, "A Nonrecursive List Compacting Algorithm," Communications of the ACM 13 (11), 1970.

* cited by examiner

*Primary Examiner* — Amy Ng
(74) *Attorney, Agent, or Firm* — Vazken Alexanian

(57) ABSTRACT

A memory management method and a system for performing garbage collection. The method includes the steps of providing in a memory space a heap partitioned into a plurality of areas including an area for object allocation and a To area for future object allocation. In garbage collection, an object reachable from a root set among objects allocated in the area of use is copied into the To area. In addition, a finalizable object among the objects allocated in the area of use is set as a finalization target. Here, the finalizable object is an object unreachable from the root set and has a finalize method. After the garbage collection is completed, the finalizable object of finalization target allocated in the area of use is finalized.

8 Claims, 6 Drawing Sheets

MEMORY MANAGEMENT METHOD AND SYSTEM

CROSS REFERENCE TO RELATED APPLICATION

This application claims priority under 35 U.S.C. 119 from Japanese Patent Application 2008-117590, filed Apr. 28, 2008, the entire contents of which are incorporated herein.

BACKGROUND OF THE INVENTION

1. Field of the Invention

The present invention relates to a memory management method and system, particularly to garbage collection.

2. Description of Related Art

Some languages with garbage collection as a memory management function, such as Java (registered trademark of U.S., Sun Microsystems Inc.), allow defining a method of performing such a process as freeing up resources in performing garbage collection. The above method is called a finalize method in Java, and is also referred to as "a finalize method" hereinbelow. In garbage collection, if a collectable (unused) object does not have a finalize method, it is readily collected. Such an object is referred to as "a collectable (unreachable) object." On the other hand, if a collectable object has a finalize method it should not be readily collected. Such a collectable object is referred to as "a finalizable object." Instead, the finalize method should be executed before the collection. After a thread for performing finalization (finalize process) (such a thread is referred to as "finalizer thread") executes the finalize method, the finalizable object is collected, typically, in the next execution cycle of garbage collection.

There are several kinds of garbage collection. One typical kind of garbage collection is a technique called copying GC (refer to C. J. Cheney, "A Nonrecursive List Compacting Algorithm," Communications of the ACM 13 (11), 1970). In this copying GC, an entire heap is partitioned into two or more areas, and new objects are allocated in one of those areas. When no free space is left in the currently used area referred to as "area of use," garbage collection is activated. Objects reachable from a root set (that is, possibly-used objects) are copied into one of the areas other than the area of use that has been used for new object allocation. Such an area into which objects are copied is referred to as "To area." After the garbage collection is completed, new objects are allocated in the To area at positions subsequent to the copies of the objects.

As described above, a finalizable object having a finalize method is collected after the finalize method is executed. Here, to execute the finalize method, collection of all the objects reachable from the finalizable object (finalizer-reachable objects) must be delayed till the finalize method is completed.

In implementation of the garbage collection, the following procedure is performed:

1. search objects reachable from a root set (stack or the like);

2. add finalizable objects determined from a result of the above search to a queue (finalize queue) waiting for finalization of a finalizer thread;

3. search again for objects reachable from the finalizable objects; and 4. collect unnecessary objects.

In a workload generating a large number of objects each having a finalize method, the number of finalizable objects and objects reachable from the finalizable objects is large enough to reduce the collection rate in a memory. This increases not only the frequency of garbage collection but also the execution time of the garbage collection.

A copying garbage collector cannot readily collect finalizable objects and finalizer-reachable objects, even if the objects are unreachable from a root set, because their finalize methods should be executed before the collection. Hence the certain objects should be copied to the To area for the present. This means that objects other than objects reachable from the root set will be copied, and thus leads to decrease in efficiency.

SUMMARY OF THE INVENTION

According to an aspect of the present invention, a method is provided for memory management. The method includes the steps of: providing in a memory a heap space partitioned into a plurality of areas including first and second areas, the first area being currently used for object allocation, the second area being to be used for object allocation after the garbage collection; in the garbage collection, copying objects reachable from a root set among objects allocated in the first area into the second area; registering, as finalization targets, finalizable objects among the objects allocated in the first area which objects are unreachable from the root set and have a finalize method; and thereafter finalizing the finalizable objects of finalization targets allocated in the first area.

In another aspect, the present invention is implemented as a program causing a computer to execute processes respectively corresponding to the aforementioned steps in the above memory management method. This program can be provided by storing it into a recording medium, such as a magnetic disk, an optical disk, a semiconductor memory, to distribute the program, or by delivering the program over a network.

In still another aspect, the present invention is also implemented as a memory management system for performing garbage collection using copying GC. The system includes a memory, garbage collecting means and finalizing means. The memory has a heap space partitioned into a plurality of areas including first and second areas, where the first area is currently used for object allocation, and where the second area is to be used for object allocation after the garbage collection. The garbage collecting means copies, into the second area, an object reachable from a root set among objects allocated in the first area, and sets, as a finalization target, a finalizable object among the objects allocated in the first area. Here, the finalizable object is an object unreachable from the root set and having a finalize method. The finalizing means finalizes the finalizable object of finalization target allocated in the first area after the garbage collection is completed.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENT

Hereinafter, with reference to the attached drawings, detailed description will be given of an embodiment of the present invention.

This embodiment is based on garbage collection using copying GC. Generally, the garbage collection is performed on a computer system to which this embodiment is applied according to the following procedure. Note that, in the following description, a collectable object, a finalizable object and an object reachable only from a finalizable object each are an object unreachable from a root set.

First, objects reachable from the root set are copied to a To area. Neither finalizable objects nor objects reachable only from the finalizable objects are copied to the To area.

A finalizer thread finalizes objects held in an original area (area having been an area of use).

Next time the garbage collection is activated, the system is checked to confirm that the finalization of the finalizable objects recognized in the last garbage collection has already been completed.

As compared to conventional copying GC, the above method will allow operations of copying, to the To area, the finalizable objects and the objects reachable only from the finalizable objects to be omitted. Note, however, that, before the next time the garbage collection is activated and the original area is reclaimed, the system checks that the finalization has already been completed in order to ensure that the finalizable objects and the objects reachable only from the finalizable objects are to be surely collected, as described above. When the garbage collection is activated, if the finalization of the finalizable objects recognized to be finalized in the last garbage collection has not yet been completed, the system does not perform the garbage collection until the finalization is completed.

Next, a detailed description will be given of the garbage collection according to this embodiment by providing specific examples of memory structures.

Figure 1:
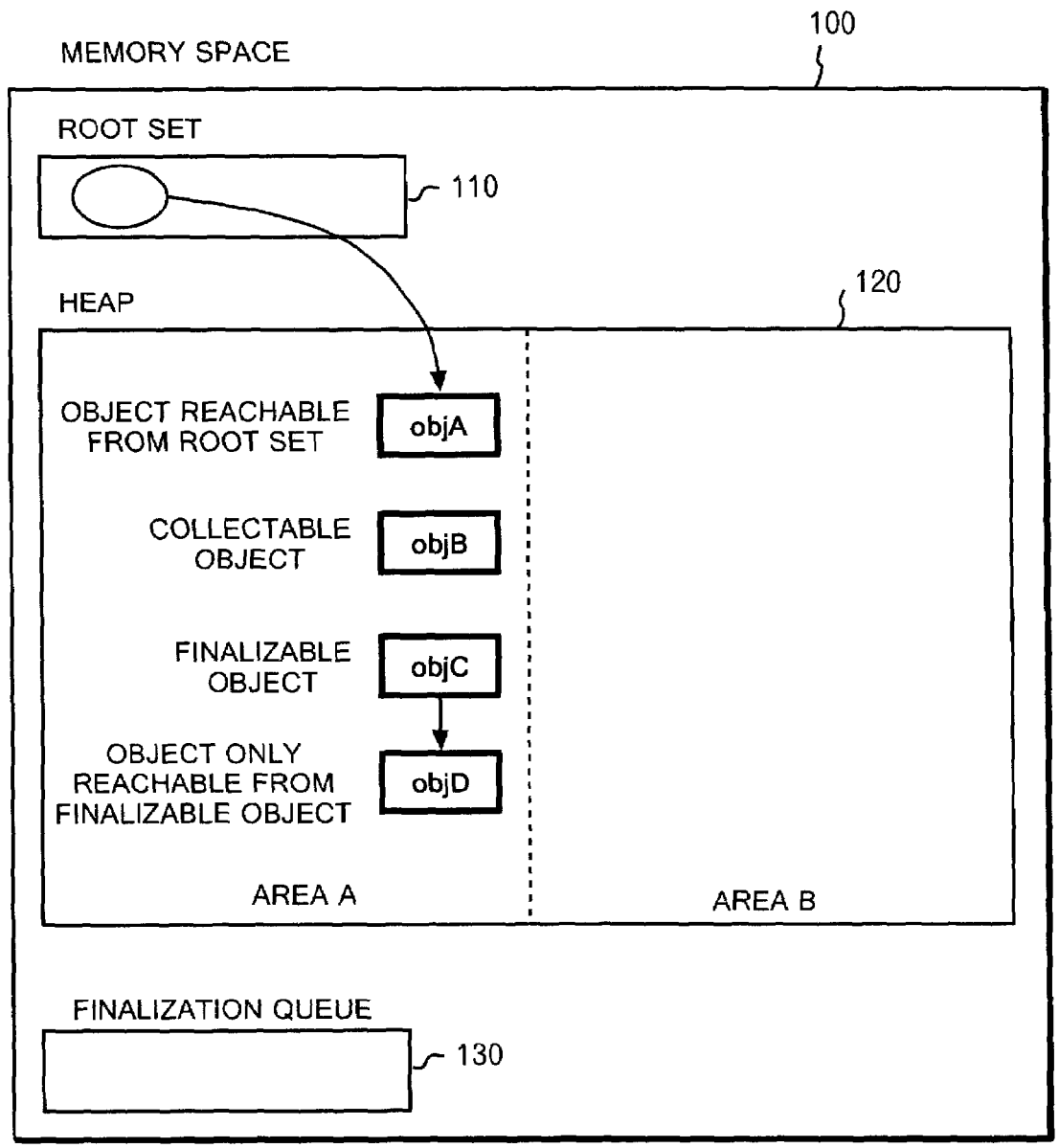
FIG. 1 shows an example of a memory structure in which garbage collection according to an embodiment of the present invention is performed.

FIG. 1 shows an example of a memory structure in which the garbage collection according to this embodiment is performed.

In the example shown in FIG. 1, a memory space of a memory 100 is provided with a root set 110, a heap 120 and a finalization queue 130, which is a queue for finalizable objects waiting for a finalizer thread to execute their finalize method. The heap 120 is partitioned into two areas A and B, and every time the garbage collection is performed, an area of use is switched between these two regions.

As shown in FIG. 1, the area A is an area of use, and the area B is a To area. Four objects (objA, objB, objC, objD) are allocated in the area A serving as the area of use. Among these objects, objA is an object reachable from the root set 110. objB is a collectable object, unreachable from the root set 110 and having no finalize method. objC is a finalizable object, unreachable from the root set 110 and having a finalize method. objD is an object reachable only from objC (finalizable object). In FIG. 1, arrows each show a reference to the object pointed by the arrow.

Figure 2:
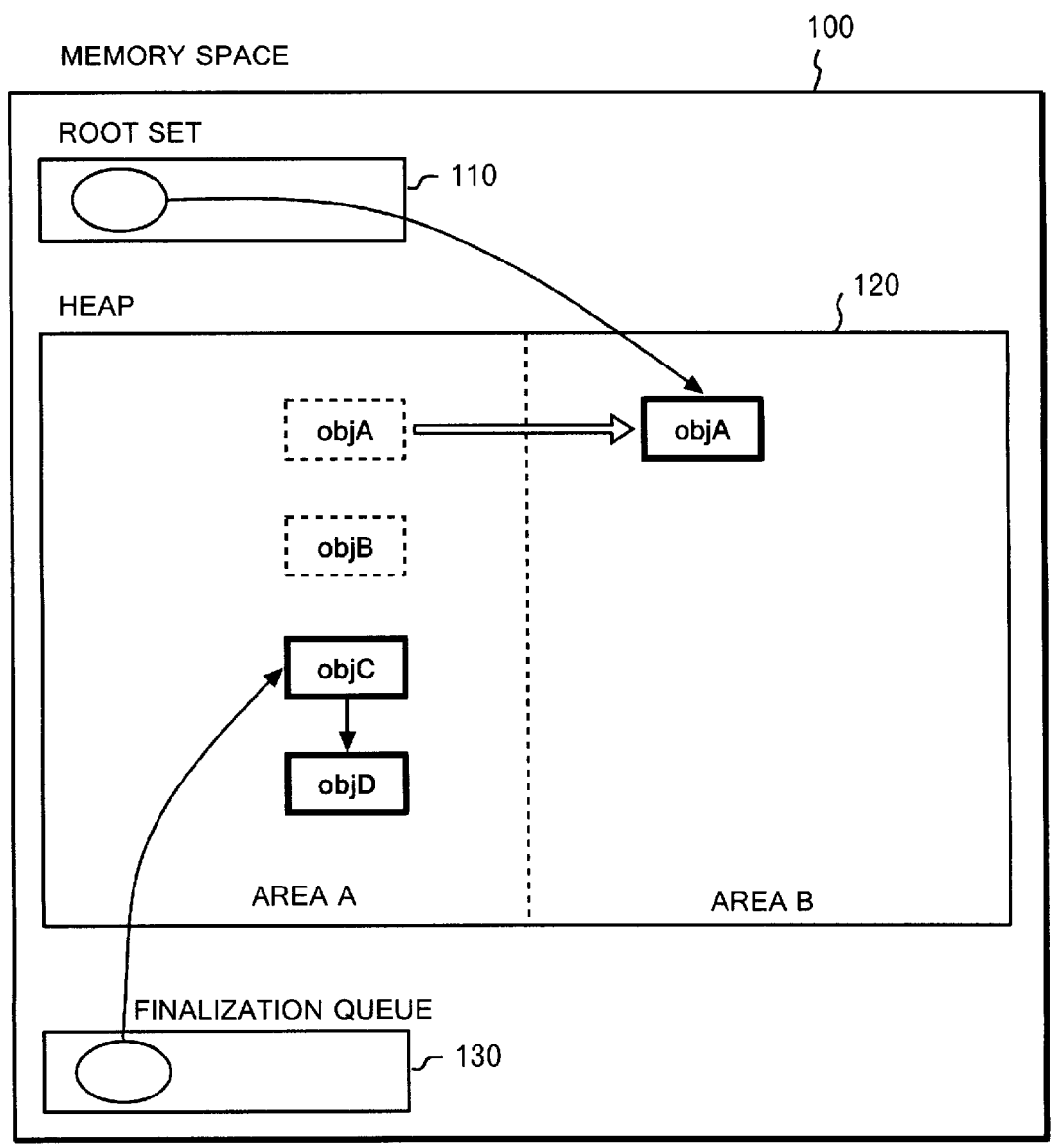
FIG. 2 shows a condition after the garbage collection is performed under the condition shown in FIG. 1.

FIG. 2 shows the memory space after the garbage collection of this invention is performed.

As seen from the FIG. 2, objA is copied into the area B serving as a To area since objA is reachable from the root set 110 and thus is not a garbage collection target. In addition, a region, in which objA has been allocated, within the area A is now freed up. In FIG. 2, copying is shown by an outline arrow and a freed-up region is shown by dotted lines. Since objB has been a collectable object, a region, in which objB has been allocated, within the area A is now freed up. objC and objD remain in the area A without being copied to the area B. In addition, objC is registered in the finalization queue 130 and the finalization queue 130 references to objC. After this, new objects are allocated into the area B, and the finalize method of objC finalizes objC and objD remaining in the area A.

With respect to finalization, an object reachable from a finalizable object is not necessarily an object reachable only from the finalizable object. In the example shown in FIGS. 1 and 2, objD is reachable only from objC. However, in some finalization, objC could reference to an object also reachable from the root set 110, such as objA. In this case, on the basis of a pointer (Forwarding pointer) generated when the corresponding object is copied, and indicating a copy destination of the object in the area B, a referent from objC in finalization should be updated such that objC can reference to the copy of the object. This update of the referent may be performed when the garbage collection is performed or when the finalize method is performed.

Figure 3:
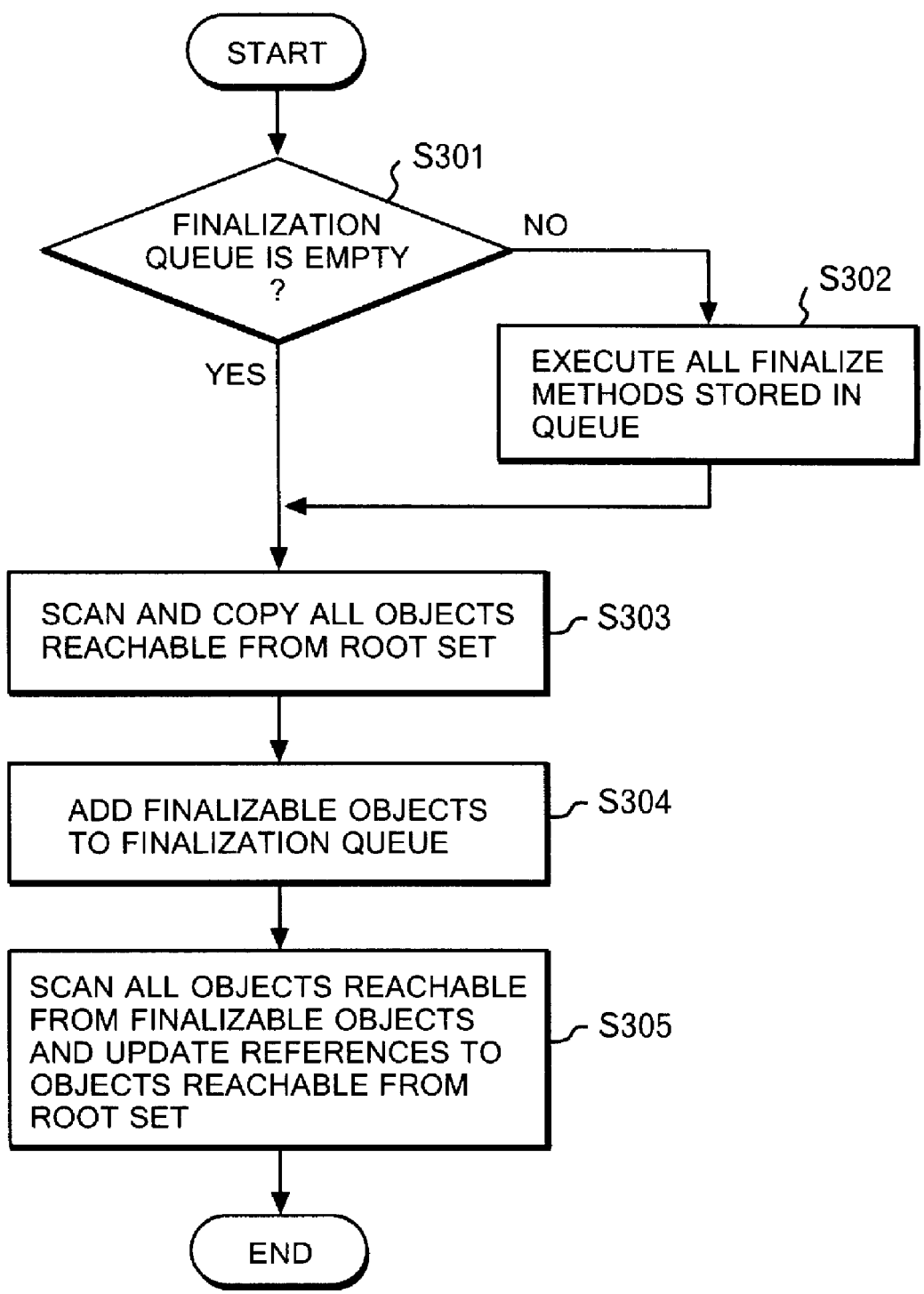
FIG. 3 is a flowchart showing a process flow in the garbage collection according to the embodiment.

FIG. 3 is a flowchart showing a process flow in the garbage collection according to this embodiment.

It is assumed that the memory structure used here is the structure shown in FIG. 1, and that objects are initially allocated into the area A. When no free space is left in the area A as program execution proceeds in the system, the garbage collection is activated. As shown in FIG. 3, when the garbage collection is activated, it is first checked whether the finalization queue 130 is empty (step 301). If the finalization queue 130 is not empty, the finalizer thread executes finalize methods of all the finalizable objects registered in the finalization queue 130 (step 302), and the garbage collection is not performed until the finalization is completed.

If the finalization queue 130 is empty, or after the finalization is completed, the garbage collection is performed. In the garbage collection, all the objects reachable from the root set 110 are first scanned to be copied to the area B (step 303). Then the regions, in which the collectable objects and the original objects copied into the area B are respectively allocated, within the area A are freed up.

The finalizable objects remaining in the area A are then registered in the finalization queue 130 (step 304). This registration makes these finalizable objects targets of the finalization of the finalizer thread. All objects reachable from the finalizable objects are then scanned, and if any of the finalizable objects references an object which is reachable from the root set 110, the referent is updated (step 305). Note that the update of the referent in step 305 may alternatively be performed when finalization is performed after the garbage collection is completed.

After garbage collection is completed, the system returns to normal program processing. New objects are then allocated into the area B, which has become an area of use.

In parallel with the normal program processing, the finalizer thread finalizes the finalizable objects registered in the finalization queue 130 in step 304. Specifically, the finalizer thread finalizes each finalizable object of finalization target by executing the finalize method belonging to the finalizable object. When no free space is left in the area B as program execution proceeds in the system, the garbage collection is activated again. New objects are then allocated into the area A having become an area of use again.

Figure 4:
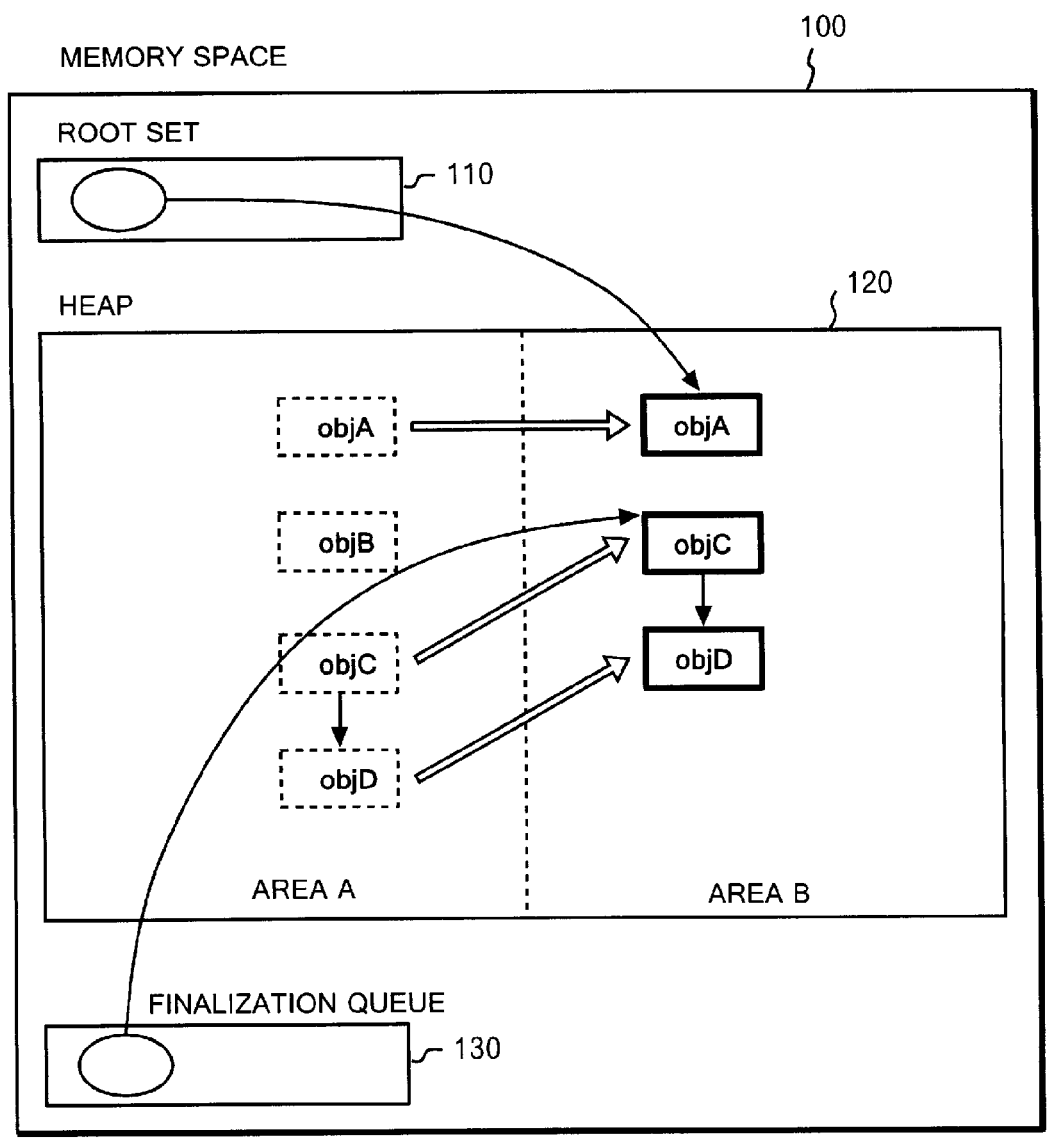
FIG. 4 shows the memory after garbage collection by a conventional method is performed under the condition shown in FIG. 1.

In comparison with this embodiment, FIG. 4 shows the memory 100 after garbage collection by a conventional method is performed under the condition shown in FIG. 1.

In conventional garbage collection, all the objects except collectable objects, which can be readily collected, are copied to the area B serving as a To area so that the finalization can be performed after completion of the garbage collection.

As seen from FIG. 4, in addition to objA, objC and objD are copied into the area B. Thus, the comparison between FIG. 4 and FIG. 2 showing the garbage collection according to this embodiment shows that, in this embodiment, overhead can be reduced as neither finalizable objects nor objects reachable only from the finalizable objects are copied.

In this embodiment, next time the garbage collection is activated, it is checked whether the finalization queue 130 is already empty. If the finalization queue 130 is not empty, the garbage collection is not performed until the finalization is completed. However, the process of checking the finalization queue 130 does not require such serious cost as to be a problem in consideration of the total overhead reduction. In addition, the finalization will actually be completed before the next cycle of garbage collection so that the overhead due to this waiting will hardly be a problem.

Figure 5:
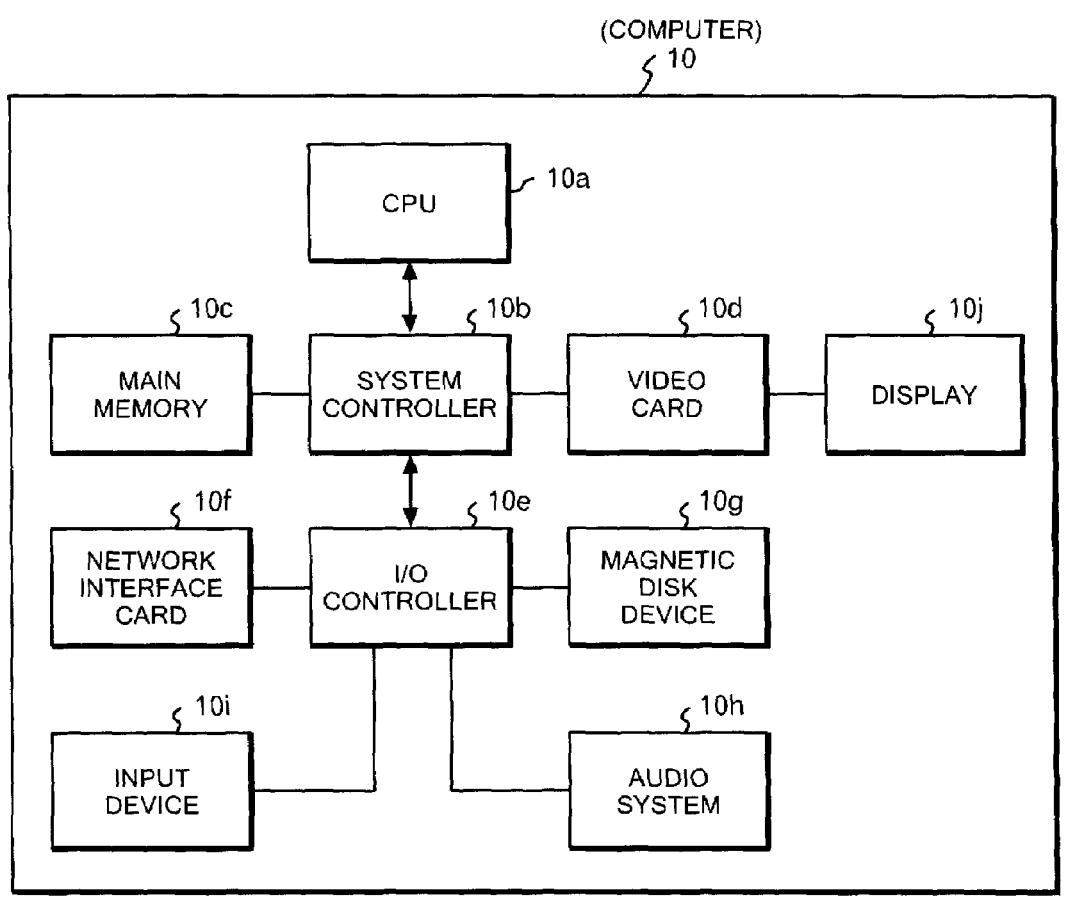
FIG. 5 shows an example of a hardware configuration of a computer to which the embodiment is applied.

FIG. 5 shows an example of the hardware configuration of a computer to which this embodiment is applied. The computer 10 shown in FIG. 5 includes a central processing unit (CPU) 10a serving as computing means, and a main memory 10c and a magnetic disk device (hard disk drive: HDD) 10g serving as storage means. Computer 10 includes a network interface card 10f for connecting external devices through a network, a video card 10d and a display 10j for image output, and audio system 10h for audio output. Computer 10 includes input devices 10i such as a keyboard and a mouse.

As shown in FIG. 5, the main memory 10c and the video card 10d are connected to the CPU 10a through a system controller 10b. The network interface card 10f, the magnetic disk device 10g, the audio system 10h and the input device 10i are connected to the system controller 10b through an I/O controller 10e. These constituents are connected through various buses such as a system bus and an input/output bus. For example, the CPU 10a is connected to the main memory 10c through a system bus and a memory bus. The CPU 10a is connected to the magnetic disk device 10g, the network interface card 10f, the video card 10d, the audio system 10h and the input device 10i through input/output buses such as a peripheral components interconnect (PCI), a PCI Express, a serial AT attachment (ATA), a universal serial bus (USB) and an accelerated graphics port.

FIG. 5 exemplifies a preferable hardware configuration of a computer. The present invention is not limited to the configuration shown in FIG. 5. For example, a configuration may be employed in which only a video memory is provided instead of the video card 10d such that image data is processed by the CPU 10a. The audio system 10h need not be configured as an independent constituent, but may be included as functionality of a chipset constituting the system controller 10b and the I/O controller 10e. In addition to the magnetic disk device 10g, drives for media of various optical disks and flexible disks may be provided as auxiliary storages. For display 10j, a liquid crystal display is typically used, but any other type of display, such as a CRT display, or a plasma display, can be used.

Figure 6:
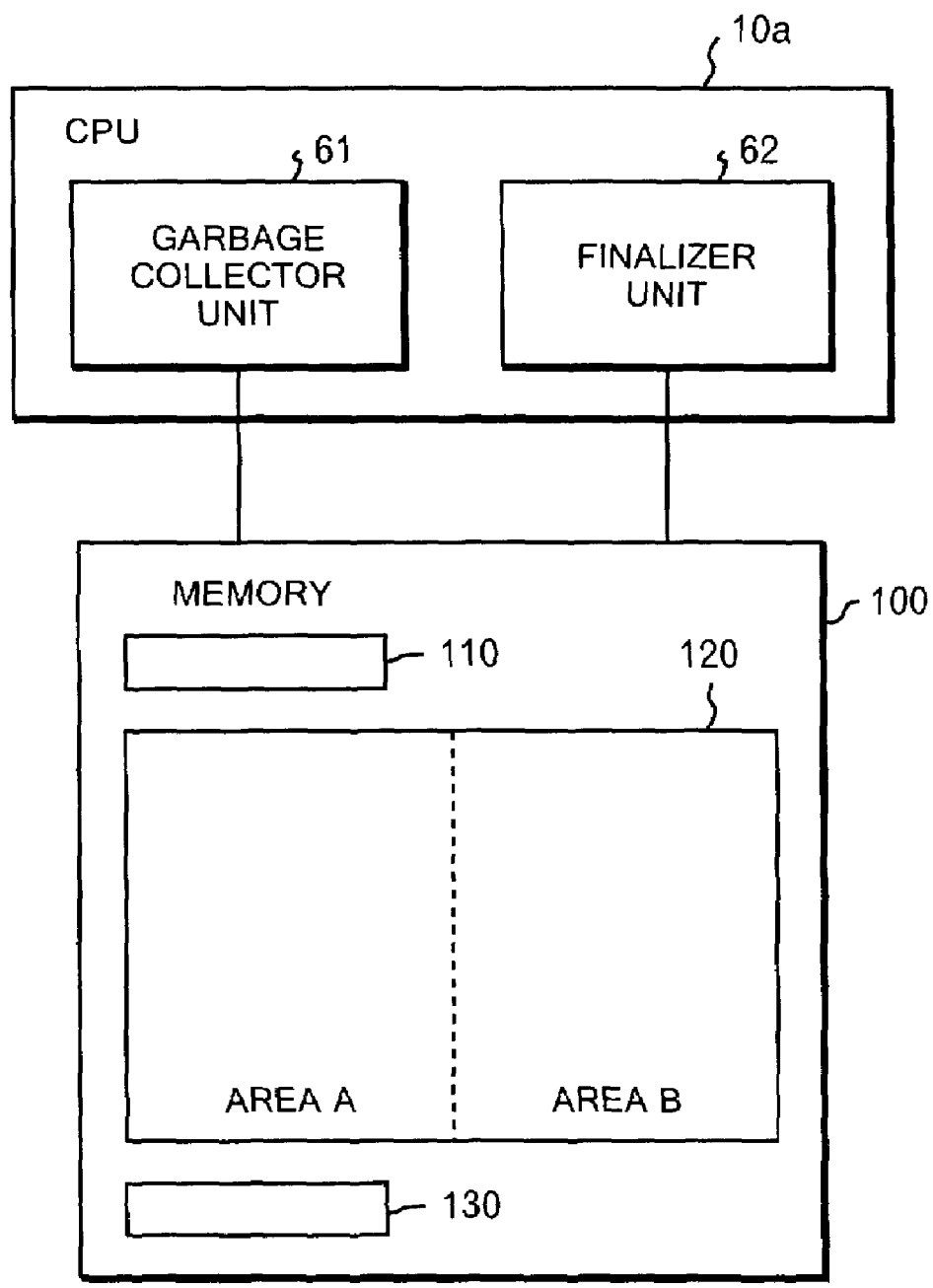
FIG. 6 shows a functional configuration of a system to which the embodiment is applied.

In the computer shown in FIG. 5, a program is read into the main memory 10c and executed by the CPU 10a. In the memory management function implemented when the CPU 10a executes the program, the processes for the aforementioned garbage collection according to this embodiment are performed. In other words, the CPU 10a controlled by this program functions as a garbage collector unit 61 performing the garbage collection and a finalizer unit (finalizer thread) 62 performing the finalization, as shown in FIG. 6.

The present invention configured as above makes it possible to effectively perform garbage collection using copying GC even when collection-target objects include an object having a finalize method.

The technical scope of the present invention is not limited to the description of the above embodiment. For example, in the above embodiment, description has been given of an example in which copying GC is performed on a heap after the heap is partitioned into two, but copying GC may be performed on a heap after the heap is partitioned into more than two. Moreover, the scope of the claims makes it apparent that other embodiments in which various modifications and improvements are made to the above embodiment are also included in the technical scope of the present invention.

What is claimed is:

1. A memory management method for performing garbage collection, comprising the steps of:
providing in a memory a heap space partitioned into a plurality of areas including first and second areas, the first area being currently used for object allocation, the second area being to be used for object allocation after the garbage collection;
in a first garbage collection, copying objects reachable from a root set among objects allocated in the first area into the second area;
registering, as finalization targets, finalizable objects among the objects allocated in the first area which objects are unreachable from the root set and have a finalize method; thereafter
in a second garbage collection, checking whether, in the first garbage collection, a finalization of the finalizable objects regarded as the finalization targets has been completed; and
if the finalization of finalizable objects (i) has been completed, finalizing the finalizable objects of finalization targets allocated in the first area and if the finalization of finalizable objects (ii) has not been completed, preventing performance of the second garbage collection until the finalization has been completed.

2. The method according to claim 1 wherein regions within the first area in which the finalizable object and an object reachable only from the finalizable object are respectively allocated are freed up after the finalization is completed.

3. The method according to claim 1, further comprising the step of updating referents of the references to the objects in the second area if the finalizable objects include references to the objects already copied into the second area.

4. The method according to claim 3, wherein the updating step is carried out when the garbage collection is performed or when the finalize method is performed.

5. The method according to claim 1 wherein, in the registering step, the finalizable objects are registered into a finalization queue used by a finalizer thread executing the finalize method.

6. The method according to claim 1, further comprising the steps of:
updating referents of the references to the objects in the second area if the finalizable objects include references to the objects already copied into the second area;

wherein, in the registering step, finalizable objects are registered into a finalization queue used by a finalizer thread executing finalize methods on the finalizable objects.

7. A non-transitory computer-readable storage medium tangibly embodying computer-executable program instructions which, when executed, cause a computer to perform garbage collection in a memory system wherein a heap space provided in a memory space is partitioned into a plurality of areas including first and second areas, the first area being currently used for object allocation, the second area to be used for object allocation after the garbage collection, the garbage collection method including the steps of:

in a first garbage collection:
copying objects reachable from a root set among objects allocated in the first area into the second area;
registering, as finalization targets, finalizable objects among the objects allocated in the first area that are unreachable from the root set and have a finalize method;

in a second garbage collection:
checking whether a finalization of the finalizable objects regarded as the finalization targets in the first garbage collection has been completed; and
if the finalization of finalizable objects (i) has been completed, finalizing the finalizable objects of finalization targets allocated in the first area and if the finalization (ii) has not been completed, preventing performance of the second garbage collection until the finalization has been completed.

8. A memory management system for performing garbage collection, comprising:

a memory having a heap space partitioned into a plurality of areas including first and second areas, the first area being used for object allocation, the second area to be used for object allocation after the garbage collection;

garbage collecting means for copying objects reachable from a root set among objects allocated in the first area into the second area and for setting finalizable objects among the objects allocated in the first area as finalization targets, wherein the finalizable objects are unreachable from the root set and have a finalize method;

checking means for checking in a second garbage collection whether a finalization of the finalizable objects regarded as the finalization targets in the first garbage collection has been completed; and if the finalization of finalizable objects (i) has been completed, finalizing the finalizable objects of finalization targets allocated in the first area and if the finalization of finalizable objects (ii) has not been completed, preventing performance of the second garbage collection until the finalization has been completed.

* * * * *